United States Patent [19]

Kapes et al.

[11] Patent Number: 5,581,952
[45] Date of Patent: Dec. 10, 1996

[54] VEHICLE WINDOW ACTUATOR MOUNTING ARRANGEMENT

[75] Inventors: Richard C. Kapes, Chesterfield; Alfred A. Bien, West Bloomfield, both of Mich.

[73] Assignee: Chrysler Corporation, Auburn Hills, Mich.

[21] Appl. No.: 522,886

[22] Filed: Aug. 31, 1995

Related U.S. Application Data

[62] Division of Ser. No. 206,985, Mar. 4, 1994, abandoned.

[51] Int. Cl.$^6$ ...................................................... B60J 5/04
[52] U.S. Cl. ................................................ 49/502; 49/348
[58] Field of Search ........................... 49/502, 348, 349, 49/350, 351, 352, 139; 296/146.2

[56] References Cited

U.S. PATENT DOCUMENTS

| | | | |
|---|---|---|---|
| 3,782,036 | 1/1974 | Clark et al. | 49/502 |
| 3,925,932 | 12/1975 | Ladd et al. | 49/227 |
| 4,471,251 | 9/1984 | Yamashita | 310/89 |
| 4,794,734 | 1/1989 | Stempien | 49/374 |
| 4,827,671 | 5/1989 | Herringshaw et al. | 49/503 |
| 4,845,894 | 7/1989 | Herringshaw et al. | 296/146.2 X |
| 4,848,829 | 7/1989 | Kidd | 296/152 |
| 4,888,916 | 12/1989 | Hess et al. | 49/352 |
| 4,970,911 | 11/1990 | Ujihara et al. | 74/501.5 R |
| 5,033,236 | 7/1991 | Szerdahelyi et al. | 49/502 |
| 5,062,240 | 11/1991 | Brusasco | 49/502 X |
| 5,090,158 | 2/1992 | Bertolini | 49/502 X |
| 5,101,596 | 5/1992 | Moore | 49/351 |
| 5,102,090 | 4/1992 | Farris et al. | 248/674 |
| 5,111,620 | 5/1992 | Lau et al. | 49/502 |
| 5,143,331 | 9/1992 | Robert | 248/27.1 |
| 5,279,468 | 1/1994 | Kuster | 242/54 R |
| 5,355,629 | 10/1994 | Kimura et al. | 49/502 |
| 5,367,827 | 11/1994 | Tajima et al. | 49/352 |
| 5,379,553 | 1/1995 | Kimura et al. | 49/502 |

FOREIGN PATENT DOCUMENTS

| | | | |
|---|---|---|---|
| 1055398 | 4/1959 | Germany | 49/349 |
| 2519637 | 12/1975 | Germany | 49/349 |
| 2928017 | 2/1980 | Germany | 49/349 |
| 2431595 | 3/1980 | Germany | 49/349 |
| 692134 | 5/1953 | United Kingdom | 49/349 |

Primary Examiner—Kenneth J. Dorner
Assistant Examiner—Jerry Redman
Attorney, Agent, or Firm—Thomas G. Pasternak

[57] ABSTRACT

A mounting arrangement including a window actuator mounting bracket for mounting on a vehicle inner door panel. The inner door panel is formed to include rear and front pairs of openings having L-shaped slots extending therefrom. The mounting device, having one of the power window motor or manual actuator mounted thereon, has outwardly extending L-shaped mounting lugs formed thereon. Bolts are threadedly mounted through the latter for sliding cooperation with the L-shaped slots of the inner door panel prior to being tightened thereon.

8 Claims, 5 Drawing Sheets

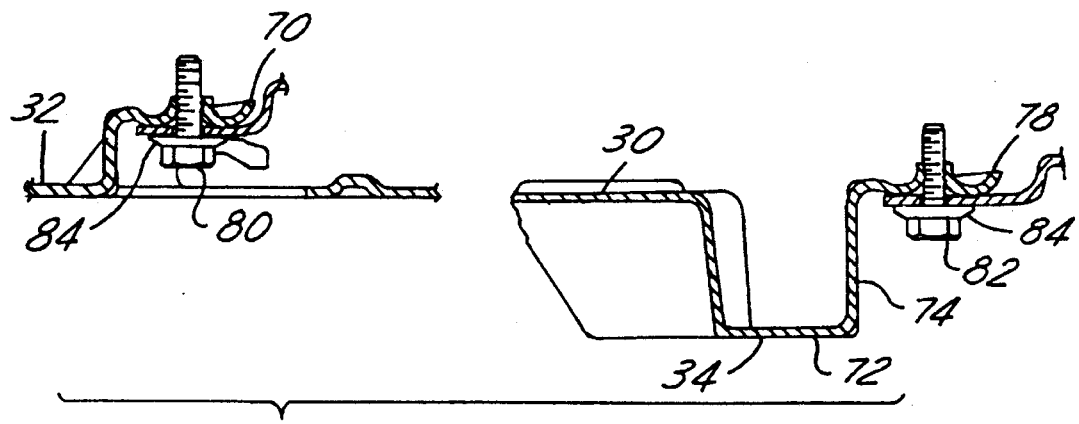
FIG. 7
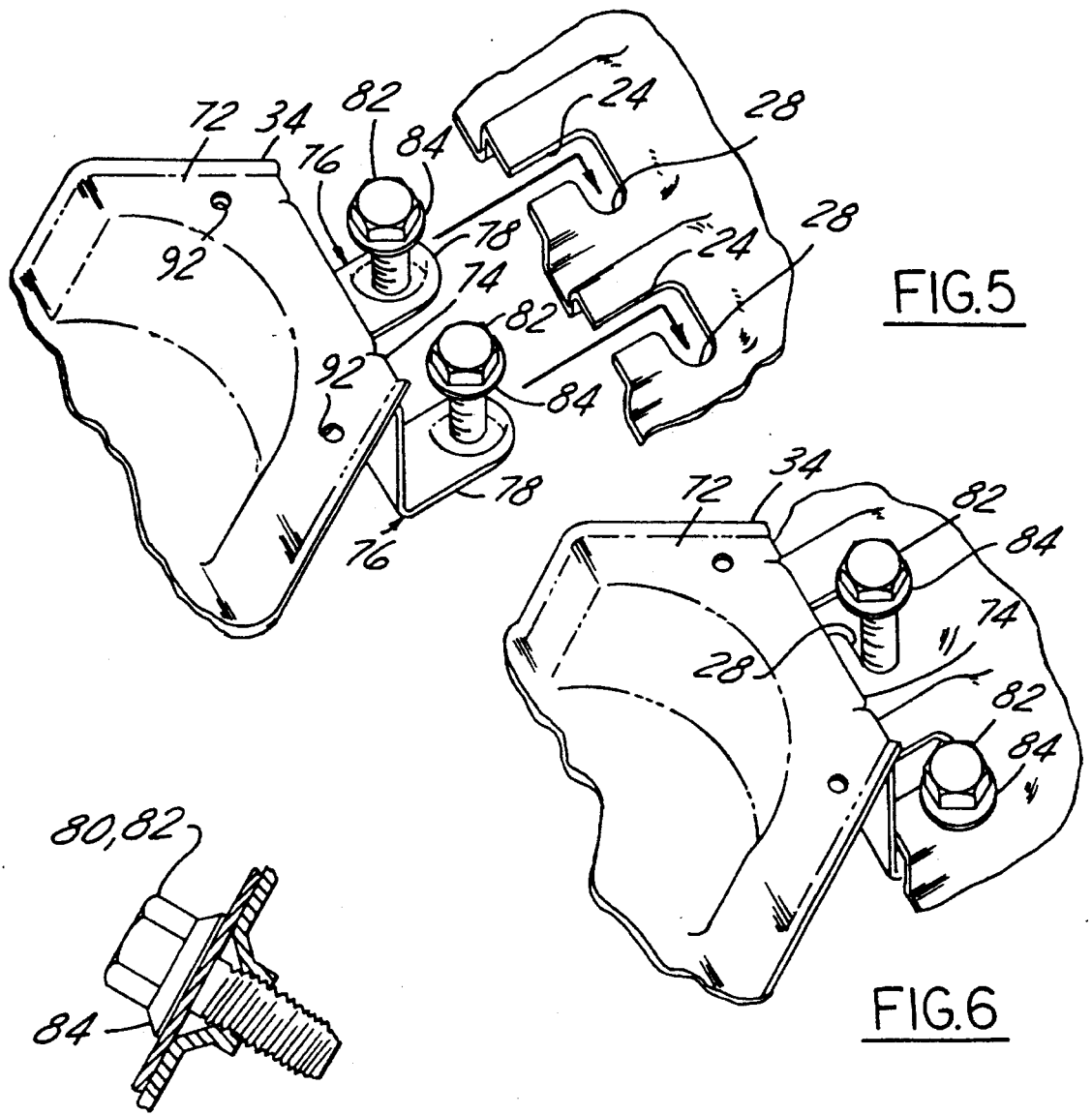
FIG. 5
FIG. 6
FIG. 8

VEHICLE WINDOW ACTUATOR MOUNTING ARRANGEMENT

This is a division of application Ser. No. 08/206,985, filed on Mar. 4, 1994, now abandoned.

TECHNICAL FIELD

This invention relates generally to a vehicle window actuator mounting arrangement and, more particularly, to a mounting bracket having either a power window motor or a manual actuator mounted thereon and adapted to slidably mount on the vehicle door inner panel.

BACKGROUND ART

Heretofore, motor vehicles have included modules to which door hardware can be attached prior to shipping the module to the vehicle manufacturer, e.g., Herringshaw et al U.S. Pat. No. 4,827,671.

Another known arrangement has included a mounting bracket for mounting a window regulator motor housing to a door panel via three aligned holes and three adjacent slots into which flexible tabs on the ends of three legs of the bracket are inserted and engaged. This is shown and described in Farris et al U.S. Pat. No. 5,102,090.

DISCLOSURE OF THE INVENTION

A general object of the invention is to provide an improved window actuator mounting arrangement.

Another object of the invention is to provide a window actuator mounting bracket which is adaptable to being slidably mounted onto an inner door panel of a vehicle.

A further object of the invention is to provide a window actuator mounting bracket having front and rear pairs of mounting lugs with threadedly attached bolts, which are slidably mountable on an inner door panel having pairs of openings for receiving the mounting lugs therethrough and L-shaped slots for slidably receiving the bolts before threadingly tightening same.

These and other objects and advantages will become more lapparent when reference is made to the following drawings and accompanying description

BRIEF DESCRIPTION OF THE DRAWINGS

FIG. 5 and 6 are enlarged, fragmentary, views of portions of the FIG. 1 components in two operational conditions;

FIG. 7 is a fragmentary cross-sectional view taken along the plane of the lines 7—7 of FIG. 4, and looking in the direction of the arrows;

FIG. 8 is an enlarged, fragmentary view of a portion of the FIG. 7 structure;

BEST MODE OF CARRYING OUT THE INVENTION

Figure 1:
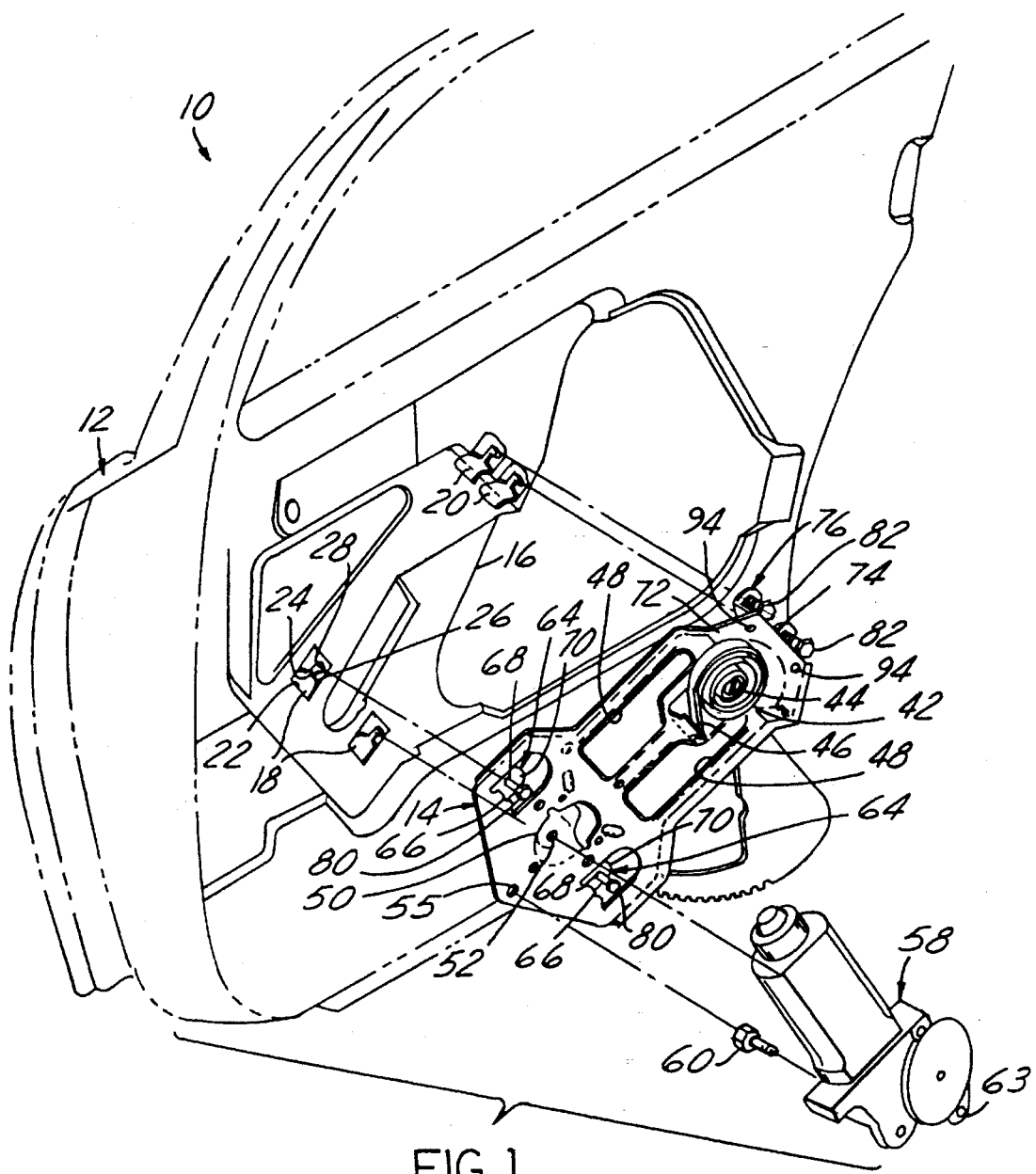
FIG. 1 is a perspective, exploded view of a vehicle door embodying the invention for use on the left hand rear door.

Referring to the drawings in greater detail, FIG. 1 illustrates a vehicle door 10 having an inner panel 12 to which a window actuator mounting bracket 14 is readily attached.

Figure 2:
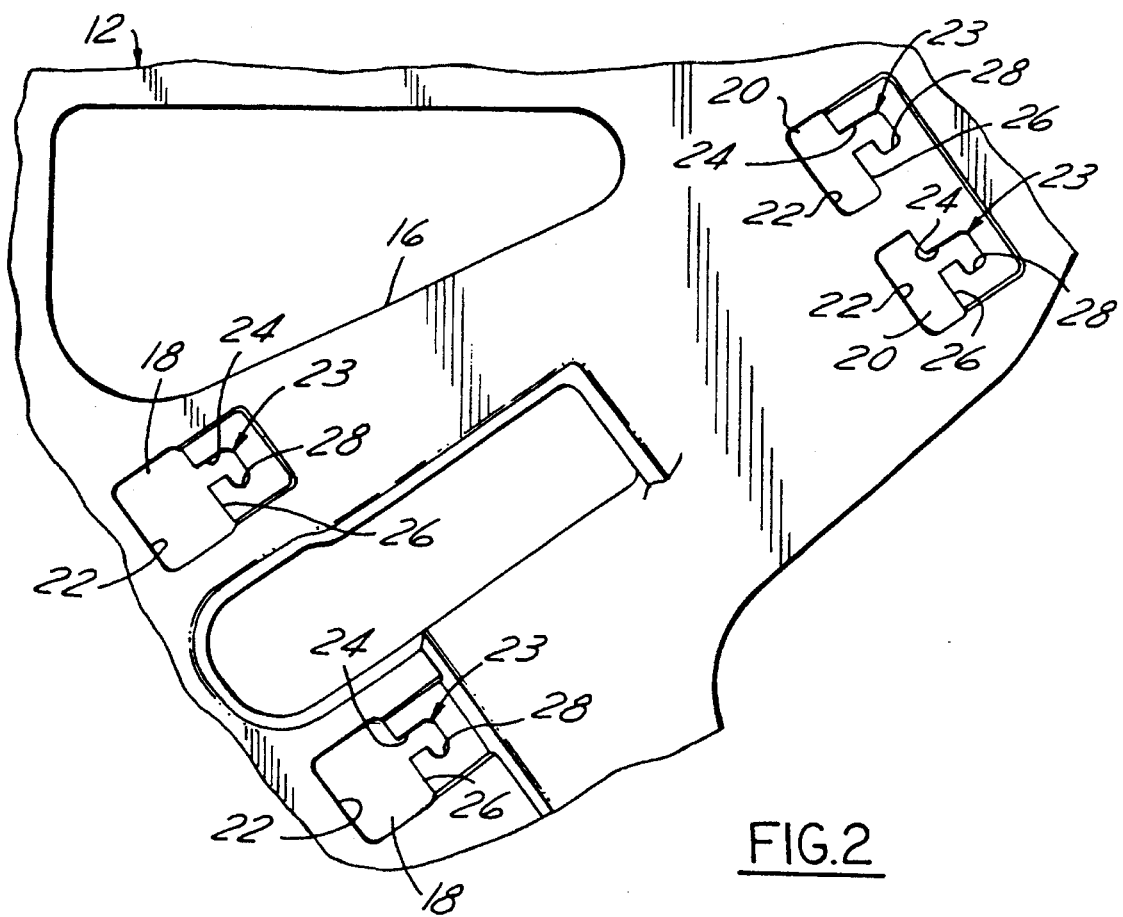
FIG. 2 is an enlarged, fragmentary side elevational view of the inner panel portion of the vehicle door of FIG. 1.

As more clearly illustrated in FIG. 2, the inner panel 12 includes a centrally located, segmented section 16 having two pairs of side-by-side rear and front openings 18 and 20, respectively, formed therein. Each of the openings 18 and 20 is formed to include a rectangular shaped portion 22, an L-shaped receiving slot 23 including a forwardly extending slot portion 24 extending from an edge 26 of the portion 22, offset a predetermined distance from the midpoint of the edge, and a downwardly extending slot portion 28 formed at the forward end of the slot 24. The rear pair of openings 18 are spaced farther apart than the front pair of openings 20.

Figure 4:
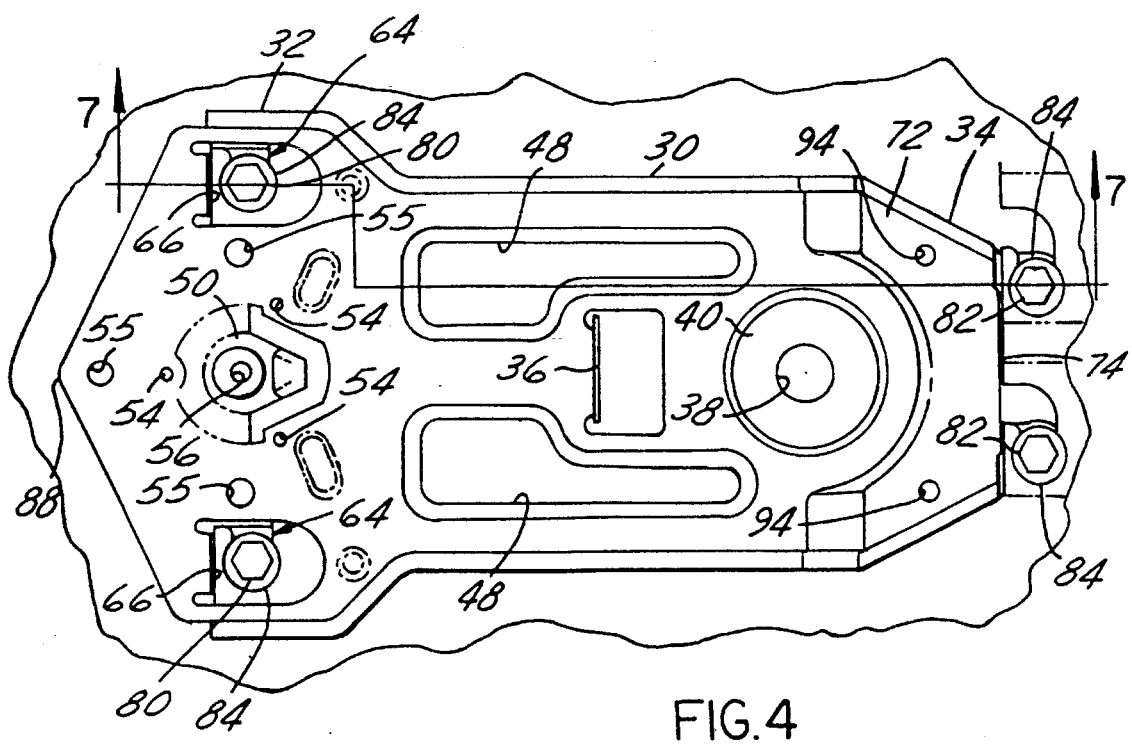
FIG. 4 is an enlarged side elevational view of a portion of the FIG. 1 structure.

As more clearly illustrated in FIG. 4, the window actuator mounting bracket 14 suitable for a particular vehicle door includes an elongated center section 30, a rear wider mounting section 32, and a forward narrower mounting section 34.

A laterally extending tab 36 (FIGS. 1, 3 and 4) is bent outwardly from a mid location of the center section 30. A round opening 38 is formed through the front center portion of the center section 30, surrounded by an annular mounting projection 40 suitable for having a coil spring 42 (FIGS. 1 and 3) retained thereon by a fastener 44 through the opening 38, with the outer extended end 46 of the coil spring hooked around an edge of the tab 36. Longitudinal slots 48 straddle the tab 36 and serve to reduce the weight of the bracket 14.

Figure 3:
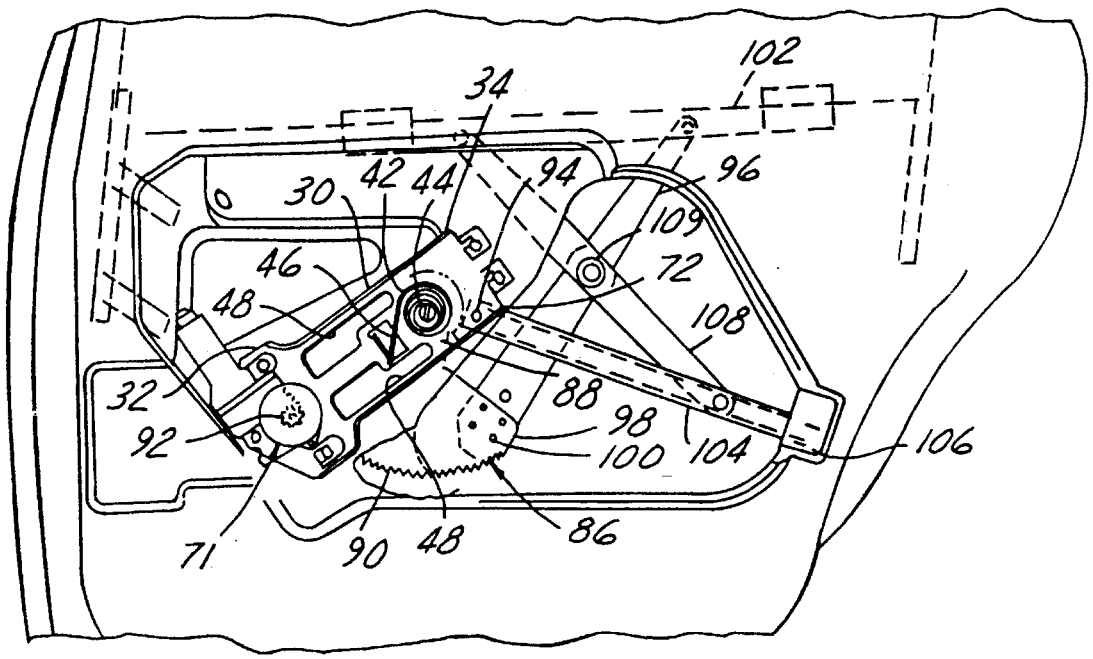
FIG. 3 is a side elevational view of the FIG. 1 components in an assembled condition.

A circular recessed portion 50 (FIGS. 1 and 4) is formed in the center of the rear mounting section 32. An opening 52 is formed through the center of the recessed portion 50, with three equidistant openings 54 mounted around the outer periphery of the recessed portion 50, and three additional spaced openings 55 in a concentric relationship with respect to the openings 54. The recessed portion 50 is adaptable to having a side of a power window actuator motor 58 mounted therein and secured by a fastener 60, with two additional fasteners (not shown) mounted through openings 63 (FIG. 1) in the motor 58 and, through the three openings 55. A first pair of L-shaped mounting tabs or lugs 64 are formed in the outer portions of the rear mounting section 32 on opposite sides of the recessed portion 50, with the closed sides 66 of the L-shaped tabs facing rearward and the bottom portion 70 extending forward. An opening 68 (FIG. 1) is formed through the center of the bottom portion 70 of each L-shaped tab 64. As shown in FIG. 3, a manual actuator is represented as 71, and is secured in the recessed portion 50 by the fastener 60 and additional fasteners (not shown) mounted through the openings 54.

The forward mounting section 34 is formed by an arcuate-shaped, elevated segment 72 surrounding the annular mounting projection 40, and of a height just above the height of the coil spring 42. A forward wall 74 of the elevated segment 72 is formed straight across the width of the section 34. A second pair of L-shaped mounting tabs or lugs 76 (FIG. 5) are formed downwardly from the forward straight wall 74 adjacent opposite ends thereof, with the bottom portions 78 of the L-shaped tabs extending forward.

Two pairs of threaded bolts 80 and 82 are mounted through the respective pairs of tabs 64 and 76, respectively. Each bolt includes an integral collar 84.

As shown in FIG. 3, a toothed rack member 86 has an end thereof pivotally mounted beneath the coil spring 42, and teeth 90 in mesh with a gear 92 on the manual actuator 71, or on the power motor 58. Two mounting openings 94 are formed in the elevated segment 72 on oppositely disposed sides thereof, for a purpose to be described.

To assemble the combination consisting of the mounting bracket 14 and the coil spring 42, the power window actuator motor 58 or manual actuator 71 onto the inner panel 12, it is only necessary to place the first and second pairs of L-shaped mounting tabs 64 and 76, respectively, and their respective pairs of bolts 80 and 82, into the two pairs of rear and front rectangular portions 22 of the openings 18 and 20, respectively, and then the combination forward, such that the bolts 80 and 82 slide through the respective slot portions 24 and down into the respective slot portions 28.

After the above mentioned combination is secured on the inner door panel 12, a first link 96 is fixedly secured at one end thereof to a side portion 98 of the rack member 86 by spot welds 100. The other end of the link 96 is pivotally secured to the bottom frame 102 of a vehicle window. A slide bar 104 is fixedly secured at one end thereof to the closer (depending on whether left hand or right hand door) of the two mounting openings 94 on the elevated segment 72 of the bracket 14, and fixedly secured at its other end to a fixed seat 106 on the door 10. A second link 108 has one end thereof slidably mounted in the slide bar 104, and its other end pivotally secured to the window frame 102, while its midpoint 109 is pivotally connected to a midpoint of the first link 96, serving to reciprocally move the window in the usual manner, upon actuation of one of the power motor 58 or the manual actuator 71. The tension of the coil spring 42 serves to retain the window in any desired up or down position determined via the manual actuator 71 or the power motor 58.

Figure 9:
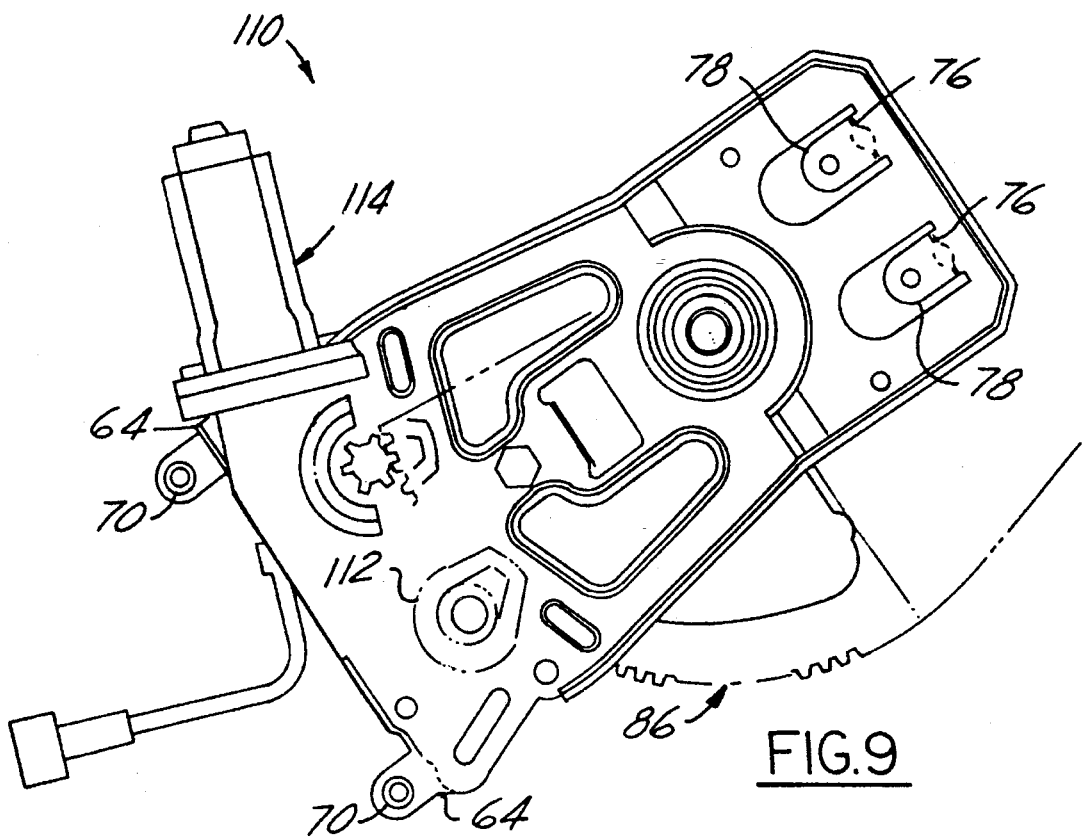
FIG. 9 is a side elevational view of an alternate embodiment of the FIG. 4 structure, for use on the left hand front door.

FIG. 9 illustrates a second bracket embodiment 110 similar to the bracket 10, except that the two pairs of L-shaped mounting tabs 64 and 76 have their respective bottom portions 70 and 78 extending rearwardly, rather than forwardly, for a different door configuration, such as for a left or right hand front vehicle door. The bracket 110 includes two side-by-side recessed portions 112 adaptable to having a power window motor 114 mounted in one of them, depending upon left or right hand side.

Figure 10:
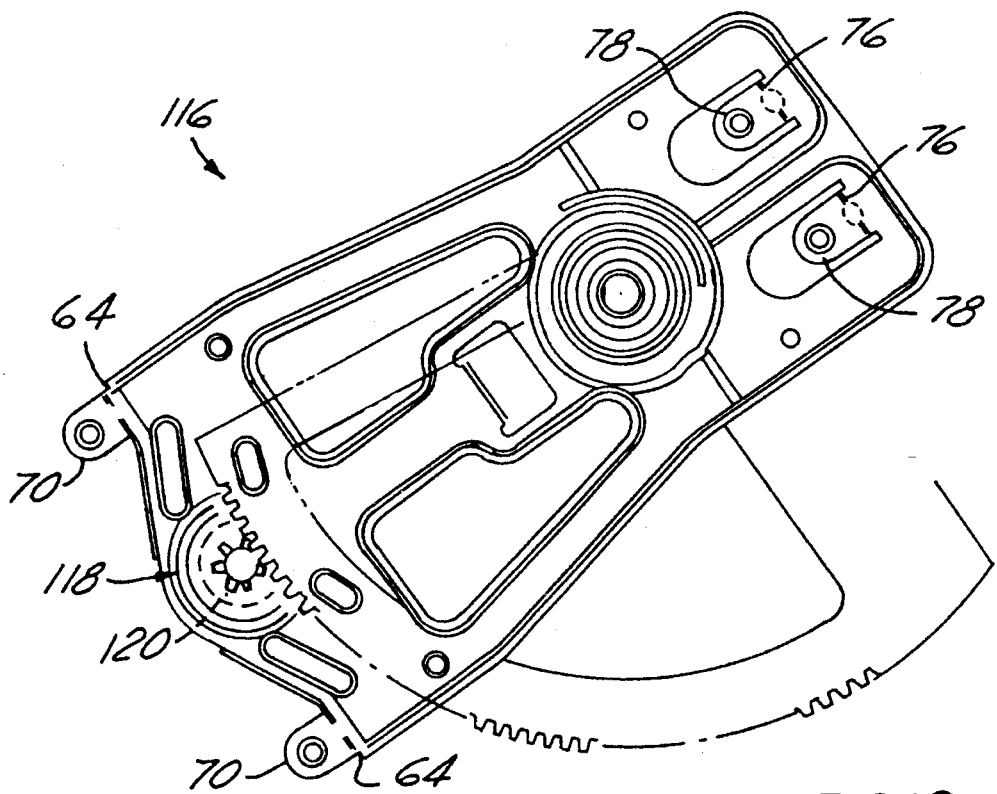
FIG. 10 is a side elevational view of another alternate embodiment similar to the FIG. 9 structure, for use on the left hand front door.

FIG. 10 illustrates a further bracket embodiment 116 with its L-shaped mounting tabs 64 and 76 having the respective bottom portions 70 and 78 thereof pointing rearwardly, as for the bracket 110, but adapted to having a manual actuator 118 mounted in a central recessed portion 120, similar to the recessed portion 50 of FIG. 4.

INDUSTRIAL APPLICABILITY

It should be apparent that the invention provides an efficient, simplified, and compact bracket having either a power window motor or a manual actuator mounted thereon, and adaptable to being easily and quickly mounted on an inner door panel of a vehicle.

While three embodiments of the invention have been shown and described, other modifications thereof are possible within the scope of the following claims.

What is claimed is:

1. The combination of a vehicle inner door panel including a mounting segment, and a separate window actuator mounting bracket, the combination comprising two rear and two front pairs of openings formed in said mounting segment, a slot extending from an edge of each of said openings, and a downwardly extending slot formed on the distal end of each of said slots, two rear and two front mounting tabs formed out of said mounting bracket such that a back portion of each tab is normal to said mounting bracket, and an end portion extends from each of said back portions, and a fastener threadedly mounted through each of said end portions, said end portions adapted to being inserted through said respective openings, and said fasteners adapted to being slidable through said respective slots and then down into said respective downwardly extending slots prior to said fasteners being tightened.

2. The combination of a vehicle inner door panel and a mounting bracket, the combination comprising two rear and two front pairs of openings in said inner door panel, a first slot extending from an edge of each of said openings, and a transversely extending second slot formed on a distal end of each of said first slots;

said mounting bracket including rear, center, and front sections;

said rear section having a recess formed in a center thereof, and a first pair of mounting lugs bent out of the rear section on oppositely disposed sides of said recess;

a second pair of mounting lugs formed on the leading edge of said front section;

a fastener threadedly mounted to each lug of said pairs of mounting lugs;

each of said mounting lugs inserted through said openings in said inner door panel, and said fasteners extended through said first slots and then into said transversely extending second slots prior to said fasteners being tightened.

3. The combination described in claim 2, wherein said first slots extends longitudinally from the openings, and said transversely extending second slots extend downwardly from the first slots, said first and second slots adapted to receive said first and second pairs of mounting lugs in progressive longitudinal and downwardly sliding motions.

4. The combination described in claim 2, wherein each lug of said first and second pairs of mounting lugs includes a first portion extending perpendicularly from said respective rear and front sections, and a second portion extending uniformly longitudinally from each said first portion.

5. The combination described in claim 4, wherein each said fastener is threadedly mounted in each second portion.

6. The combination described in claim 2, wherein said two rear and two front pairs of openings are substantially rectangular.

7. The combination described in claim 2, wherein weight reduction longitudinal slots are formed on oppositely disposed sides of said center section.

8. The combination described in claim 2, further comprising an opening formed in the center of said recess and a window actuator mounted in said recess and secured through said opening, said actuator further comprising a power window actuator motor or a manual actuator.

* * * * *